March 10, 1931.  E. L. FONSECA  1,796,196
THERMOSTATIC CONTROLLER
Filed Nov. 27, 1928   2 Sheets-Sheet 1
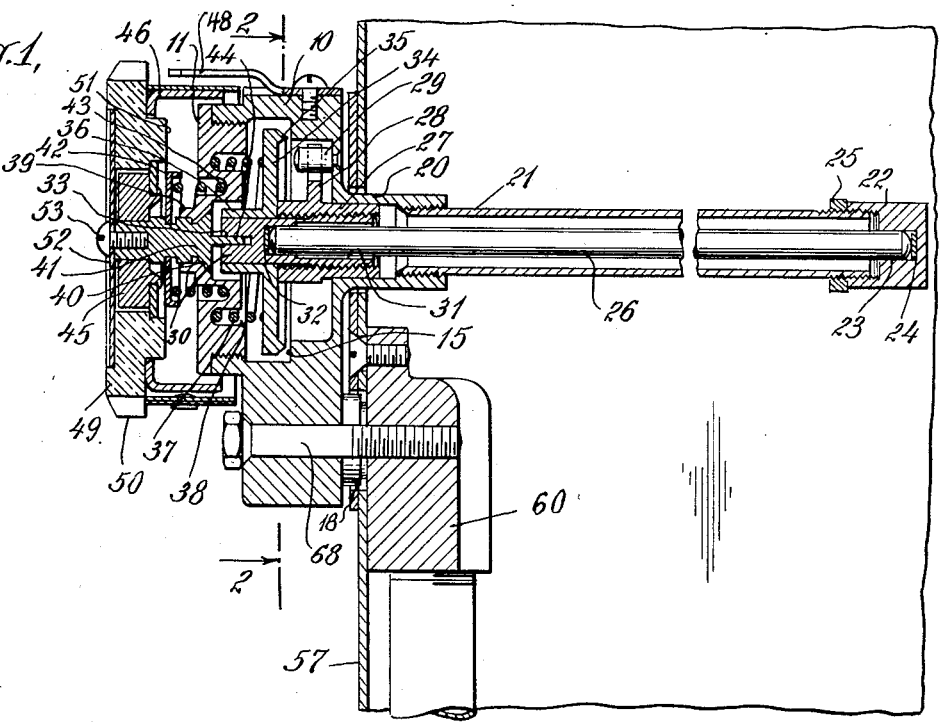
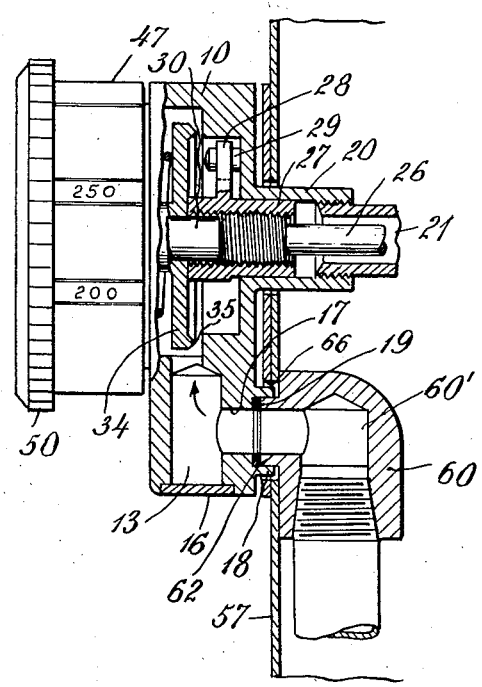
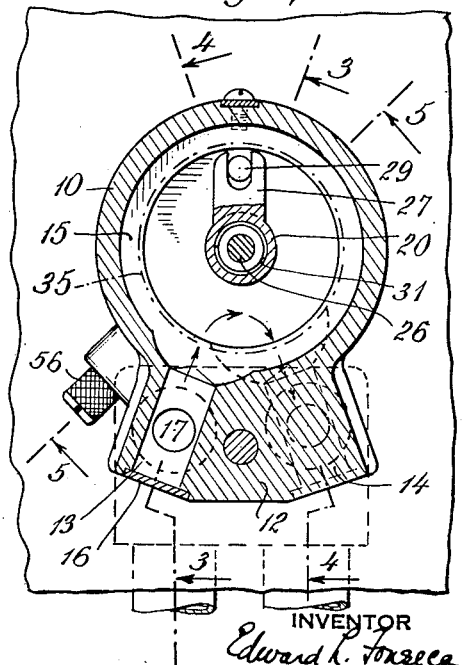

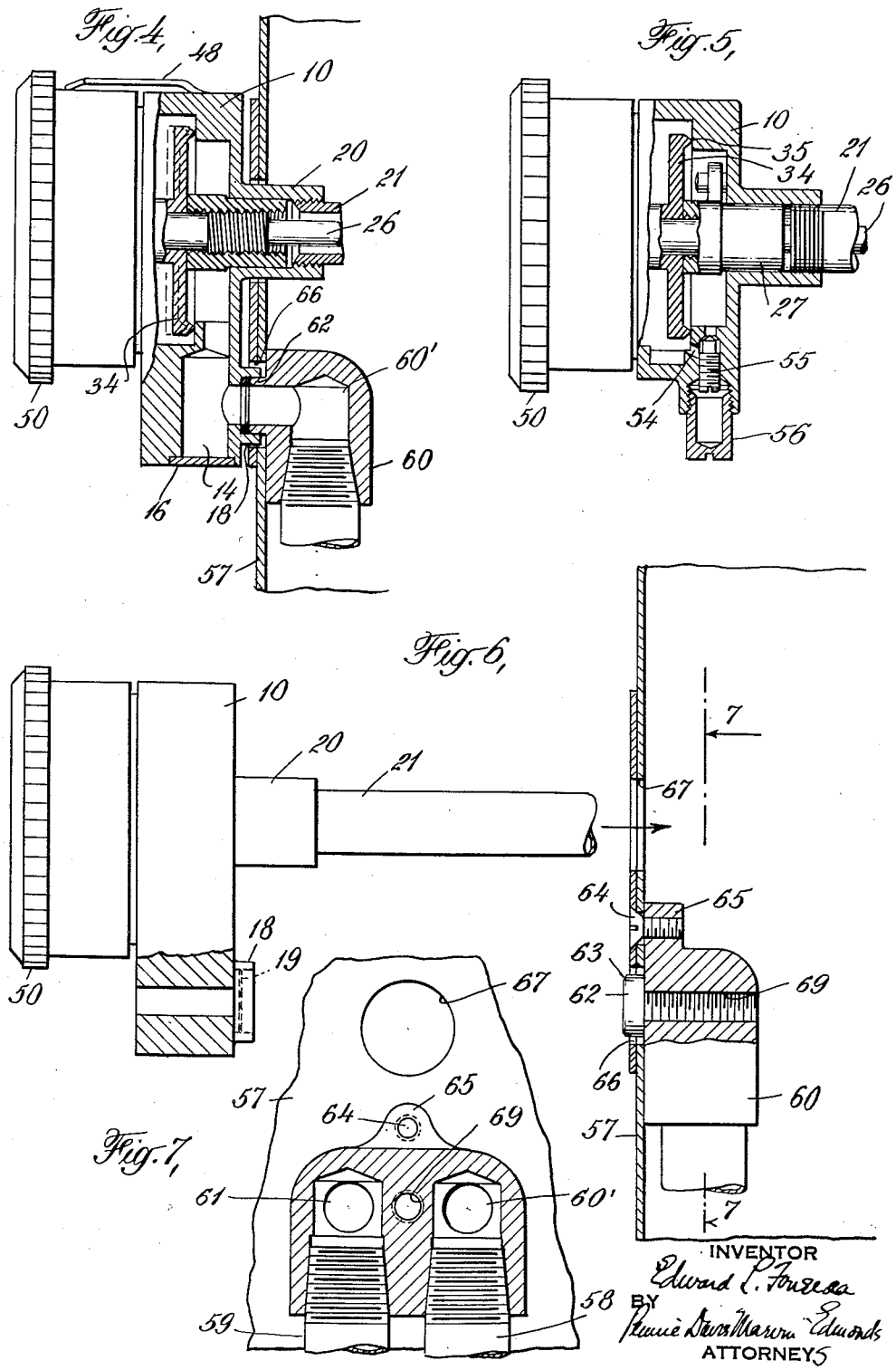

Patented Mar. 10, 1931

1,796,196

UNITED STATES PATENT OFFICE

EDWARD L. FONSECA, OF NEWARK, NEW JERSEY, ASSIGNOR TO THE WILCOLATOR COMPANY, OF NEWARK, NEW JERSEY, A CORPORATION OF DELAWARE

THERMOSTATIC CONTROLLER

Application filed November 27, 1928. Serial No. 322,110.

This invention relates to control devices having temperature-responsive means operable to control a heating element, and is concerned more particularly with a thermostatic controller in which the temperature-responsive means takes the form of an expansible and a non-expansible element disposed one within the other, such means being commonly known as a rod and tube thermostat. The controller of the present invention is constructed to control the supply of fluid fuel to a burner or the like and it contains a control valve acted on by the thermostat through adjustable operating connections by which the valve may be set to be closed by the thermostat at selected temperatures to which the thermostat is exposed.

The novel control apparatus is of simple, durable construction, inexpensive to manufacture and easy to install. It provides an accurate control of temperatures developed, for example, in a heating chamber, it is easily manipulated, and its temperature setting may be altered from one temperature to another without injury to the parts, even though certain of these parts are exposed to a relatively high temperature at the time of resetting.

The new control device is especially adapted for use on gas ranges for controlling the flow of gas to the oven burner to maintain selected temperatures in the oven chamber. An embodiment of the invention in a form suitable for use on a gas range will accordingly be illustrated and described to make clear the principles of the invention though it is to be understood that the utility of the invention is by no means confined and limited to that particular use.

The new controller includes the usual valve housing with gas passages leading thereto, and a rod and tube thermostat. The valve which is actuated by the rod is mounted independently thereof on a member against which the rod loosely bears, the adjustment of the valve with reference to this member and to its seat being determined by an abutment carried by the member and adjustable with reference thereto. The means for effecting this adjustment extends through the valve itself and out through the housing wall where a single gas-tight joint is provided, so that the interior of the tube and housing which are open to each other may be readily made tight against leakage.

In an installation of the new controller on a gas range, the gas pipes which lead to and from the valve housing may, if desired, be placed inside the oven, between the lining and the outer wall, this space being available for receiving certain of the devices leading up to the thermostat, which should be mounted in the upper part of the oven. When that is done, the ends of the pipes may be secured into a body which has a pair of passages in it and flanges projecting at the ends of these passages, the end of each flange being received by a seat formed within a wall of the valve housing of the controller, from which seats passages lead to opposite sides of the valve.

The flanges may project through openings in the oven wall and fit in the seats snugly and at their ends they may bear against packing washers, thus providing a means for conducting gas from the pipes inside the oven, to and from opposite sides of the valve in the controller mounted on the outside of the oven.

A common bolt or a pair of bolts may be employed for securing the parts together and to the oven wall, the arrangement in this respect being such that tightening the bolt or bolts force the ends of the flanges on the body tightly against the packing washers in the seats so that not only is the thermostat mounted securely in position, but also by means of the special construction above outlined, gastight joints are provided in the connections for conveying gas to and from the valve.

For a better understanding of the invention, reference may be made to the accompanying drawings in which, Fig. 1 is a longitudinal sectional view through the device as installed on a gas range;

Fig. 2 is a sectional view on the line 2—2 of Fig. 1;

Figs. 3, 4 and 5 are partial sectional views on the lines 3—3, 4—4, and 5—5 of Fig. 2;

Fig. 6 is a view partly in section illustrating the manner of installing the controller, and Fig. 7 is a sectional view on the line 7—7 of Fig. 6.

Referring now to these drawings, the controller is shown as including a valve housing made up of a cup-shaped member 10 and a cap 11 threaded into the end of the member to serve as a closure. The member 10 has an extension 12 from its bottom side in which are formed a pair of gas passages 13, 14 leading to opposite sides of a valve seat 15. Each passage is formed by drilling an opening in the extension 12, the outer end of each opening being closed by a plug 16. Other openings 17 are then drilled in the rear wall of the extension communicating, respectively, with the openings first made, so that each passage 13, 14 is made up of two smaller passages extending at right angles to each other. On the rear face of the extension are formed circular flanges 18, each surrounding the end of an opening 17 and having a slightly greater diameter than the diameter of the opening so that a packing washer 19 may be inserted in the recess so formed without restricting the entrance to the opening. The flanges 18 form seats for co-operating parts later referred to.

Projecting from the rear face of the member 10 is a hollow boss 20 into the end of which is threaded one end of a tube 21 of expansible metal, the other end of the tube being closed by gas-tight cap 22. This cap has an inner recess 23 in the end of which is a bearing disc 24 of suitable material such as steel, the tube and cap preferably being made of copper. Leakage between the cap and tube is prevented by the lock nut 25. Within the tube and bearing at one end against the disc 24 is a rod 26 of suitable non-expansible material, preferably a nickel-steel, this rod extending through the boss 20 into the valve housing.

Mounted within the housing is an abutment member 27 in the form of a sleeve threaded internally and provided with a projecting lug 28 forked at its free end to straddle a pin 29 mounted on the inner wall of the member 10. The engagement of the lug and pin prevents rotational movement of the abutment member but permits endwise movement. The sleeve portion of the abutment member at one end projects a substantial distance into the boss 20 in which it is supported, though free to move therein.

Within the abutment is a cap member 30 recessed at one end as at 31 to receive the end of the rod 26, which bears against a hardened steel disc 32 at the bottom of the recess. The cap is externally threaded at one end, the threads engaging those in the inner wall of the abutment and being of considerably less length. In the solid end of the cap member is a slot 33 for the reception of means by which the cap can be rotated. By reason of its engagement with the end of the rod 26, the cap, when rotated, does not move longitudinally but the engagement of its threads with those in the abutment causes the latter to move endwise.

Within the housing is a valve 34 comprising a disc with a sharp circumferential flange 35 adapted to engage the valve seat 15 and cut off the flow of gas through the housing from passage 13 to passage 14. The valve 34 has a hollow hub 36 fitting the end of the cap 30, the valve being forced against the end of the abutment 27 by a spring 37 bearing at one end against the valve disc and seated at its other end in a circular channel 38 formed in the closure member 11 of the housing. With this construction, rotation of the cap 30 varies the position of the abutment and changes the position of the valve with reference to its seat, thereby varying the temperature at which the valve will be closed as the tube expands and the rod follows it. The fit between the valve hub and cap is preferably sufficiently snug so that the valve will rotate as the cap is turned until the flange 35 on the valve comes in contact with the seat. This rotation of the valve causes the flange to keep the face of the seat clean, but continued rotation of the cap after the valve is seated will not cause the flange to cut the seat because the valve is not fast on the cap. Were it not for the loose mounting of the valve as described, the reseating of the device for a relatively low temperature after exposure to a substantially higher temperature would cause the valve to be forced against its seat with a rotary movement which would cause the seat to be injured by the cutting action of the valve flange.

The closure member 11 is provided with a hollow central boss 39, the wall of the opening through the boss being cut away at its inner end as at 40 to form a tapered seat against which bears an inclined surface on the enlarged head of a short shaft 41. This shaft projects through the closure and outside the housing carries a disc 42, against the inner face of which bears one end of a spring 43 seated at its other end in a circular channel in the closure 11. This spring tends to force the shaft out of the housing so that its head bears against the inclined seat in the closure boss to provide a gas-tight joint. On its inner end, the shaft terminates in a key 44 loosely entering the slot 33 in the end of the cap 30.

On its outer end, the shaft carries a disc 45, to one face of which is secured a cup member 46, the free edge of which partially overlies the end of the housing for the valve. On the annular wall 47 of the cup member is a scale of temperatures over which projects a pointer 48 secured to the outer wall of the housing. A suitable stop (not shown) is also provided engageable with the pointer to prevent the cup member from being rotated more than one turn.

Against the flat face of the cup member is mounted a disc 49, preferably of vitreous material, and providing a setting handle, the disc having a serrated edge 50 so that it may be readily manipulated. The disc is held against rotation relative to the cup member by means of projections 51 on its rear surface receivable into openings in the flat face of the cup member, and is held in place on the end of the shaft by a plate 52 secured to the end of the shaft by a screw 53.

With the arrangement described, the device is set for the maintenance of a selected temperature by turning the shaft by the handle until the pointer registers with the desired temperature reading on the scale. In such turning movement, the cap member moves the abutment lengthwise, the valve following and taking a new position nearer or farther from its seat as the case may be. When the temperature developed by the burner to which gas flows through the device reaches the selected value, the tube will have expanded sufficiently so that the valve, moved by its spring as the rod, cap and abutment member move, will seat and shut off the flow of gas. When the temperature falls, the tube contracts, moving the rod into the housing and moving the cap and abutment to cause the valve to open against its spring.

In order to permit a regulated flow of gas around the valve to maintain a pilot, for example, a passage 54 (Fig. 5) is formed in the wall of the housing connecting passages 13 and 14, the flow of gas through the passage being controlled by a needle valve 55 threaded into the wall of the housing and protected against tampering by a cap 56.

The new controller is especially adapted for use on gas ranges and it is conveniently mounted thereon by the means illustrated in Figs. 1, 4, 6, and 7. The outer wall of the oven is shown at 57 and just inside this wall are installed pipes 58 and 59. The pipe 58 leads from a source of gas and the pipe 59 to the oven burner or manifold. These pipes are threaded into the lower face of a body 60, such as a casting, provided with a pair of passages 60' and 61, these passages making a right-angled turn and leading out through the side wall of the body. From this wall project circular flanges 62, each defining a part of a passage, and each flange having a rounded edge 63. After the pipes have been threaded into the body, the latter is attached to the wall 57 in any convenient manner as by a screw 64 passing through the wall and into a lug 65 on the body. The flanges 62 now project through openings 66 previously formed in the oven wall.

The controller is placed against the outer face of the wall 57 with the rod and tube entering an opening 67 in the wall, which opening is properly formed so that the flanges 62 may enter the recesses defined by the flanges 18 on the housing and bear against the packing washers 19. The controller is secured in position by a bolt 68 inserted through an opening in the extension 12 from the housing, through an opening in the oven wall, and into a threaded opening 69 in the body 60. When the bolt is drawn tight, the controller is held rigidly in position and gas-tight connections are made between the passages 13 and 14 in the extension, and passages 58 and 59 in the body respectively.

By employing projecting flanges integral with the back casting 60 which fit snugly into seats defined by the flanges 18 on the valve housing, the tightening of the bolt 68 makes gas-tight connections between the passages in the valve housing and in the casting. Also, the controller is held rigidly against movement in any direction and cannot be displaced either accidentally or intentionally.

The valve housing made up of the cup and closure member may be readily made tight against gas leakage and this is true also of the tube in which the rod is loosely mounted. Adjustment of the rod in the tube is not necessary after the device has been assembled and the cap at the end of the tube may be permanently secured in position. The operating shaft passes through the closure member of the valve housing and a gas-tight joint is provided at this point without using packing. The device can, therefore, be readily adjusted and the adjusting means does not permit leakage.

It will be seen that in the new controller all of the operating parts except the handle are fully enclosed and protected. The rod is loosely mounted in the tube and the valve is supported independently of the rod, so the proper seating of the valve does not depend on the position of the rod. There are many objections to a construction in which the valve is threaded directly on the rod, since, for instance, the rod must then be held rigidly in the tube at its outer end and if the tube is bent slightly in the installation of the device, the rod will hold the valve at an angle to its seat and the valve cannot close properly. In the present device, the rod is not rigidly mounted at either end, so that the difficulties above mentioned are avoided. By mounting the valve loosely on the cap member, the valve is permitted to adjust itself properly to its seat and cutting of the seat is avoided and resetting of the device after a period of use is not only not interfered with but does not injure the mechanism.

What I claim:

1. A control device comprising the combination of temperature-responsive means including a part movable as the temperature varies, a valve, a transmitting element independent of said valve consisting of two relatively adjustable members disposed one within the other, the first member abutting said part, the second member abutting said valve means engaging said second member for preventing rotation thereof, and means engaging the said first member for varying the adjustment of the members, said first member and said means extending from one side of the valve to the other.

2. A control device comprising the combination of temperature-responsive means including a part movable as the temperature varies, a valve, a transmitting element independent of said valve consisting of two relatively adjustable members disposed one within the other, the first member abutting said part, the second member abutting said valve means engaging said second member for preventing rotation thereof, and means on the other side of said valve from said element and engaging said first member for varying the adjustment of said members.

3. A control device comprising the combination of temperature-responsive means including a part movable as the temperature varies, a valve, a transmitting element independent of said valve consisting of two relatively adjustable members disposed one within the other, the first member abutting said part and entering an opening through said valve, the second member abutting said valve means engaging said second member for preventing rotation thereof, and means engaging said first member for varying the adjustment of said members.

4. A control device comprising the combination of temperature-responsive means including a part movable as the temperature varies, a valve, a transmitting element independent of said valve consisting of two relatively adjustable members disposed one within the other, the first member abutting said part and entering an opening through said valve, the second member abutting said valve means engaging one member for preventing rotation thereof, and means engaging the other member and operable on the other side of said valve from said element for varying the adjustment of the members.

5. A control device comprising the combination of temperature-responsive means including a part movable as the temperature varies, a valve, a transmitting element independent of said valve consisting of two relatively adjustable members disposed one within the other, the first member abutting said part, the second member abutting said valve, said first member being accessible through an opening in the valve from the side opposite to that adjacent said temperature-responsive means, means for preventing rotation of said second member and means lying on the other side of the valve from said element and engaging the accessible part of said first member for varying the adjustment of said members.

6. A control device comprising the combination of a housing, a valve within the housing co-operating with a seat therein, temperature-responsive means operable to vary the position of the valve with relation to its seat as temperature changes occur, a transmitting element independent of said valve consisting of two relatively adjustable members disposed one within the other, one member being engaged by said temperature-responsive means, the other member engaging said valve means engaging said other member for preventing rotation thereof, and means entering the housing and operable from outside the housing for varying the relative adjustment of said members.

7. A control device comprising the combination of a housing, a valve within the housing co-operating with a seat therein, temperature responsive means extending through one wall of the housing and operable to vary the position of the valve with relation to its seat as temperature changes occur, a transmitting element independent of said valve consisting of two relatively adjustable members disposed one within the other, one member being engaged by said temperature responsive means, the other member loosely engaging said valve means for preventing rotational movement of said other member, a shaft entering the housing, and a connection between the shaft and said first member for varying the relative adjustment of said members upon rotation of said shaft.

8. A control device comprising the combination of a housing, a valve within the housing co-operating with a seat therein, temperature responsive means extending through one wall of the housing and operable to vary the position of the valve with relation to its seat as temperature changes occur, a transmitting element independent of said valve consisting of two relatively adjustable members, one member being engaged by said temperature responsive means and entering an opening through said valve, the other member loosely engaging said valve, means for preventing rotational movement of said valve-engaging member and a shaft entering the housing and connected to said first member for varying the relative adjustment of said members.

9. A control device comprising the combination of a housing, a valve within the housing co-operating with a seat therein, a tube extending from the housing and in communication with the interior thereof, a rod mounted within the tubes, the rod and tube constituting temperature-responsive means, a transmitting element independent of said valve interposed between the rod and the valve, this element consisting of a pair of relatively adjustable members, one loosely abutting the rod, the other abutting the valve means engaging said valve-abutting member for preventing rotation thereof, and means engaging the member abutting the rod and operable to vary the relative adjustment of the members.

10. A control device comprising the combination of temperature-responsive means, a valve, a transmitting element consisting of a pair of relatively adjustable members, one actuated by the temperature-responsive means and loosely carrying the valve, the other engaging and actuating the valve, and means for varying the relative adjustment of said members.

11. A control device comprising the combination of temperature-responsive means, a valve, a transmitting element consisting of a pair of relatively adjustable members, one actuated by the temperature-responsive means and loosely carrying the valve, the other engaging and actuating the valve, and means engaging said first member for varying their relative adjustment.

12. A control device comprising the combination of temperature-responsive means, a valve, a member extending into and supporting the valve, this member being engageable by the temperature-responsive means, a second member engaging the valve and determining its position, said member being adjustable relatively to the first member, and means for effecting relative adjustment of the members.

13. A control device comprising the combination of temperature-responsive means, a valve, a transmitting element interposed between the valve and said means, said element consisting of a pair of relatively adjustable members, one of said members supporting the valve without interfering with the movement thereof and also being engageable by said temperature-responsive means, the other member abutting the valve, and means engaging said first member for effecting relative adjustment of the members.

14. A control device comprising the combination of temperature-responsive means, a housing, a valve within the housing, a movable member supported in the housing wall and abutting the valve, a second movable member engageable by said means and supporting the valve, and means operable from without the housing for adjusting the members relatively to each other.

15. A control device comprising the combination of temperature-responsive means, a housing, a valve within the housing, a movable member supported in the housing wall and abutting the valve, a second movable member disposed within the first and movable relatively thereto, said second member supporting the valve and also being engageable by said means, and means for adjusting the relative positions of the members.

16. A control device comprising the combination of a rod and tube thermostat, a cap member into which an end of the rod extends, a valve supported loosely on the cap member, an abutment member engaging the valve, and means for effecting relative adjustment of said members.

17. A control device comprising the combination of a rod and tube thermostat, a cap member against which an end of the rod bears, an abutment member supported for endwise movement, a valve mounted loosely on the cap member and engaging said abutment member, a spring forcing the valve and abutment member into engagement, and means for effecting relative adjustment of the members.

18. A control device comprising the combination of a rod and tube thermostat, a cap member engaging an end of the rod, a valve mounted loosely on the cap member, an abutment member supporting the cap member and engaged by said valve, and means for effecting relative adjustment of said members.

19. In a control device, the combination of a rod and tube thermostat, a cap member receiving an end of the rod, a valve loosely mounted on the cap member, an abutment member into which the cap member extends, this member engaging the valve and supporting the cap member, and means for effecting relative adjustment of said members.

20. In a control device, the combination of temperature-responsive means, a member movable thereby, a valve loosely mounted on said member, a member into which said first member is threaded to be supported thereby, said second member abutting said valve, and means for rotating said first member to effect relative adjustment of said members.

21. In a control device, the combination of temperature-responsive means, a member movable thereby, a valve loosely mounted on said member, a member into which said first member is threaded to be supported thereby, means preventing rotational movement of said second member while permitting endwise movement thereof, said second member abutting said valve, and means for rotating said first member to vary the relative positions of the members.

22. In a control device, a valve, a tube having a closed end, a rod loosely mounted within the tube and bearing against the closed end thereof, a transmitting element between the valve and the rod, this element having a recess to receive one end of the rod, said end of the rod being rounded and a bearing disc in the recess against which the rounded end of the rod abuts, said means and the member which it engages extending from one side of the valve to the other.

23. A control device for a gas heater burner, comprising a valve housing, a valve and valve seat within the housing, passages in the housing leading to opposite sides of said valve seat, a body having passages for gas, a pipe leading to one passage in the body from a source of gas, a pipe leading from the other passage in the body to the burner, projecting flanges on the body, one at the end of each passage therein, seats on the housing into which the flanges project, packing material between the flanges and their respective seats, and means for securing the body and housing together operable to force said flanges into gas-tight engagement with the packing material.

24. A control device comprising the combination of temperature-responsive means including a part movable as the temperature varies, a valve, a transmitting element independent of said valve consisting of two members disposed one within the other and threaded together, the first member abutting said part, the second member abutting said valve, means engaging the first member for rotating it to vary the relative adjustment of the members, and means for preventing rotational movement of the second member.

25. A control device comprising the combination of temperature-responsive means, including a part movable as the temperature varies, a valve, a transmitting element consisting of two relatively adjustable members threaded one within the other, the first member abutting said part, the second member abutting said valve, said valve being loosely supported on said first member, means engaging said first member for rotating it to vary the relative adjustment of the members, and means engaging the second member for preventing rotational movement thereof.

In testimony whereof I affix my signature.

EDWARD L. FONSECA.